(12) United States Patent
Cabral et al.

(10) Patent No.: US 10,230,904 B2
(45) Date of Patent: Mar. 12, 2019

(54) THREE-DIMENSIONAL, 360-DEGREE VIRTUAL REALITY CAMERA SYSTEM

(71) Applicant: Facebook, Inc., Menlo Park, CA (US)

(72) Inventors: Brian Keith Cabral, San Jose, CA (US); Forrest Samuel Briggs, Palo Alto, CA (US); Joyce Hsu, Oakland, CA (US); Albert Parra Pozo, San Mateo, CA (US); Andrew Hamilton Coward, State College, PA (US)

(73) Assignee: Facebook, Inc., Menlo Park, CA (US)

( * ) Notice: Subject to any disclaimer, the term of this patent is extended or adjusted under 35 U.S.C. 154(b) by 263 days.

(21) Appl. No.: 15/096,140

(22) Filed: Apr. 11, 2016

(65) Prior Publication Data

US 2017/0295324 A1 Oct. 12, 2017

Related U.S. Application Data

(60) Provisional application No. 62/318,822, filed on Apr. 6, 2016.

(51) Int. Cl.
*H04N 5/225* (2006.01)
*H04N 5/232* (2006.01)
(Continued)

(52) U.S. Cl.
CPC .......... *H04N 5/247* (2013.01); *H04N 5/2251* (2013.01); *H04N 5/2353* (2013.01);
(Continued)

(58) Field of Classification Search
CPC ............. H04N 13/0242; H04N 13/243; H04N 5/2251; H04N 5/23206; H04N 5/23238; H04N 5/2353; H04N 5/247; G03B 17/561
(Continued)

(56) References Cited

U.S. PATENT DOCUMENTS

| 3,535,442 A | 10/1970 | Jennings |
| D253,786 S | 12/1979 | Montague |

(Continued)

FOREIGN PATENT DOCUMENTS

| CN | 304096250 | 4/2017 |
| CN | 304096251 | 4/2017 |

(Continued)

OTHER PUBLICATIONS

GoPro Odyssey, six pages, [online] [retrieved Jun. 22, 2016], Retrieved from the internet <https://gopro.com/odyssey>.

(Continued)

*Primary Examiner* — Marly S Camargo
(74) *Attorney, Agent, or Firm* — Fenwick & West LLP (57) ABSTRACT

A camera system is configured to capture 360 degree image information of a local area, at least a portion of which is in stereo. The camera system includes a plurality of peripheral cameras, a plurality of axis cameras, a first rigid plate, and a second rigid plate, each aligned along an alignment axis. The peripheral cameras are arranged in a ring configuration that allows objects in the local area past a threshold distance to be within the fields of view of at least two peripheral cameras. The first and second rigid plates secure to a top and a bottom surface of the ring of peripheral cameras, respectively. At least one axis camera is arranged along the alignment axis and is coupled perpendicularly to a surface of the first rigid plate.

20 Claims, 8 Drawing Sheets

(51) Int. Cl.
  *H04N 5/235* (2006.01)
  *H04N 5/247* (2006.01)
  *G03B 17/56* (2006.01)
  *H04N 13/243* (2018.01)

(52) U.S. Cl.
  CPC ..... *H04N 5/23206* (2013.01); *H04N 5/23238* (2013.01); *H04N 13/243* (2018.05)

(58) Field of Classification Search
  USPC ..... 348/36, 373–376, 153, 159, 139, 38, 47, 348/48, 264, 333.05, 333.04; 396/419, 396/424, 535; 250/239
  See application file for complete search history.

(56) References Cited

U.S. PATENT DOCUMENTS

| | | |
|---|---|---|
| D262,222 S | 12/1981 | Vernon |
| D288,414 S | 2/1987 | Finkler |
| D331,060 S | 11/1992 | Emmons et al. |
| D424,086 S | 5/2000 | Choi |
| D445,123 S | 7/2001 | Shen |
| D475,385 S | 6/2003 | Christianson |
| D493,479 S | 7/2004 | Yoshikawa |
| D496,676 S | 9/2004 | Yoshikawa |
| D505,439 S | 5/2005 | Liiv |
| 6,947,059 B2 | 9/2005 | Pierce et al. |
| 7,126,630 B1 | 10/2006 | Lee et al. |
| 7,429,997 B2 | 9/2008 | Givon |
| 7,463,280 B2 | 12/2008 | Steuart |
| 7,834,910 B2 | 11/2010 | DeLorme et al. |
| D645,071 S | 9/2011 | Hinkel |
| 8,138,942 B2 | 3/2012 | Otsuka et al. |
| D664,178 S | 7/2012 | Hinkel |
| D671,157 S | 11/2012 | Richardson et al. |
| D700,232 S | 2/2014 | Ramsay et al. |
| D733,208 S | 6/2015 | Tzarnotzky et al. |
| D734,380 S | 7/2015 | Tzarnotzky et al. |
| 9,152,019 B2 | 10/2015 | Kintner |
| D742,955 S | 11/2015 | Kozko et al. |
| D745,076 S | 12/2015 | Pfeil |
| D768,751 S | 10/2016 | Sarwari |
| 9,513,458 B1 | 12/2016 | Flugge et al. |
| D780,248 S | 2/2017 | Anari, III et al. |
| 9,575,394 B1 | 2/2017 | Wallace |
| D785,070 S | 4/2017 | Mistry et al. |
| D798,930 S | 10/2017 | Macmillan et al. |
| D803,288 S | 11/2017 | Ham et al. |
| 9,883,159 B2 | 1/2018 | Fink |
| 9,921,464 B1 | 3/2018 | Choi |
| D818,024 S | 5/2018 | Chen |
| D819,105 S | 5/2018 | Kitade et al. |
| D821,479 S | 6/2018 | Cabral et al. |
| 2002/0046218 A1* | 4/2002 | Gilbert .......... H04N 5/232 715/203 |
| 2004/0246333 A1 | 12/2004 | Steuart, III |
| 2005/0207487 A1 | 9/2005 | Monroe et al. |
| 2008/0298674 A1 | 12/2008 | Baker et al. |
| 2009/0201413 A1 | 8/2009 | Fishman |
| 2011/0249100 A1 | 10/2011 | Jayaram et al. |
| 2012/0105574 A1* | 5/2012 | Baker .......... H04N 5/225 348/36 |
| 2012/0154521 A1 | 6/2012 | Townsend et al. |
| 2012/0242786 A1 | 9/2012 | Sasagawa et al. |
| 2014/0153916 A1 | 6/2014 | Kintner |
| 2015/0138311 A1 | 5/2015 | Towndrow |
| 2015/0254871 A1 | 9/2015 | MacMillan et al. |
| 2015/0346589 A1 | 12/2015 | Dering et al. |
| 2015/0373269 A1 | 12/2015 | Osborne |
| 2016/0088280 A1 | 3/2016 | Sadi et al. |
| 2016/0088287 A1 | 3/2016 | Sadi et al. |
| 2016/0191815 A1 | 6/2016 | Annau et al. |
| 2016/0212409 A1 | 7/2016 | Cole et al. |
| 2016/0352982 A1* | 12/2016 | Weaver .......... H04N 5/2253 348/38 |
| 2017/0295309 A1* | 10/2017 | Cabral .......... H04N 5/235 348/264 |
| 2017/0295358 A1* | 10/2017 | Cabral .......... H04N 5/2352 348/47 |

FOREIGN PATENT DOCUMENTS

| | | |
|---|---|---|
| CN | 304104906 | 4/2017 |
| KR | 10-2011-0075730 A | 7/2011 |
| WO | WO 2002/44808 A2 | 6/2002 |

OTHER PUBLICATIONS

Jump—Google VR, five pages, [online] [retrieved Jun. 22, 2016], Retrieved from the internet <https://vr.google.com/jump/>.

Lee, Nicole, "Samsung unveils Project Beyond, a 3D-capturing camera for Gear VR," engadget, Nov. 12, 2014, two pages, [online] [retrieved Jun. 22, 2016], Retrieved from the internet <https://www.engadget.com/2014/11/12/samsung-project-beyond/>.

Lytro Immerge, six pages, [online] [retrieved Jun. 22, 2016], Retrieved from the internet <https://www.lytro.com/immerge#immergeDetails>.

Nokia OZO: Virtual Reality Camera with 360degree audio and video capture, six pages, [online] [retrieved Jun. 22, 2016], Retrieved from the internet <https://ozo.nokia.com/>.

Technology—Jaunt, four pages, [online] [retrieved Jun. 22, 2016], Retrieved from the internet <https://www.jauntvr.com/technology/>.

Cohen, D., "F8 2016: Facebook Surround 360 3-D 360-Degree Camera System," Apr. 12, 2015 [Online] [Retrieved Jul. 7, 2017] Retrieved from the Internet <URL:https://www.adweek.com/digital/f8-2016-facebook-surround-360photo/>.

Droidsans Co., Ltd., "How to take a 360 degree photo on Facebook to rotate the atmosphere around us," Jun. 12, 2016 [Online], [Retrieved Jul. 7, 2017] Retrieved from the Internet <URL:https://droidsans.com/how-to-take-facebook-360photo/>.

European Patent Office, Search Report and Opinion, European Patent Application No. EP 17154618.7, dated Mar. 31, 2017, seven pages.

Facebook, Inc., "A durable and high quality 3D-360 camera system now available on GitHub," Apr. 2016, [Online], [Retrieved Jul. 7, 2017] Retrieved from the Internet <URL:https://facebook360.fb.com/facebook-surround-360/>, WordPress.com.

Lehrbaum, R., "Facebook open sources a 17-camera 3D-360 video capture system," Jul. 30, 2016 [Online] {Retrieved Jul. 7, 2017] Retrieved from the Internet <URL:https://linuxguzmos.com/facebook-open-sources-a-3d-360-video-capture-system/>.

Newton, C., "This is Facebook's gorgeous, open-source 360-degree video camera," The Verge, Apr. 12, 2016 [Online] [Retrieved Jul. 7, 2017] Retrieved from the Internet <URL:https://www.theverge.com/2016/4/12/11395898/facebook-surround-360-video-camera-vr-f8-conference.>.

PCT International Search Report and Written Opinion, PCT Application No. PCT/US2017/015834, dated May 15, 2017, twenty-one pages.

Aldred, J., "Facebook Posts its Open Source 3D 360 Camera Rig and Software to Github," posted at Diyphotography.net, Jul. 29, 2016, three pages. [Online], [Retrieved Jun. 19, 2017] Retrieved from the Internet, <URL: http://www.diyphotography.net/facebook-posts-open-source-3d-360-camera-rig-software-github/.>.

Facebook 360-degree video camera, announced Apr. 12, 2016 [on line], [site visited Jul. 7, 2017] Available from Internet URL: <https://www.theverge.com/201 6/4/12/11395898/facebook-su rround-360-video-camera-vr-fS-conference>.

Facebook 360 Surround Camera, announced Apr. 12, 2016 [on line], [site visited Oct. 26, 2016], Available from Internet URL: <https://www.youtube.com/watch?v=H Eua6dQrg0g> at approximately 2:15.

Surround 360 VR Camera, announced Apr. 12, 2016 [on line], [site (56) References Cited

OTHER PUBLICATIONS visited Oct. 26, 2016], Available from Internet URL: <https://www.youtube.com/watch?v=zwrsGQpHJWI> at approximately 7:45.

* cited by examiner

THREE-DIMENSIONAL, 360-DEGREE VIRTUAL REALITY CAMERA SYSTEM

CROSS-REFERENCE TO RELATED APPLICATIONS

This application claims the benefit of prior U.S. Provisional Patent Application No. 62/318,822, filed Apr. 6, 2016, the disclosure of which is hereby incorporated by reference in its entirety.

BACKGROUND

The disclosure relates generally to camera assemblies, and more specifically to three-dimensional (3D), 360-degree camera systems for virtual reality systems.

Virtual reality systems capture images and/or video of an environment with one or more cameras. The images and/or video captured by the cameras are reconstructed to create a virtual reality that a user can interact with. The configuration of the one or more cameras impacts the quality of the images captured and the ability to reconstruct the images for a seamless virtual reality experience. Hence, the configuration of the cameras and lower quality captured images can adversely affect a user's virtual reality experience.

SUMMARY

A camera system is configured to capture images and/or video across 360 degrees of a local area, at least a portion of which is in stereo. The camera system includes a plurality of peripheral cameras, one or more axis cameras, a first rigid plate, and a second rigid plate.

The plurality of peripheral cameras are arranged in a ring configuration around a center point of the camera system. The optical axis of each peripheral camera is within a plane, and each peripheral camera faces away from the center point, such that objects in the local area that are past a threshold distance from the center point are within fields of view of at least two peripheral cameras. Accordingly, the peripheral cameras are able to image objects that are past the threshold distance in stereo. The first rigid plate secures to top surfaces of the peripheral cameras, and the second rigid plate secures to bottom surfaces of the peripheral cameras, thereby creating a rigid structure. The rigid structure minimizes movements of the peripheral cameras relative to one another.

The one or more axis cameras may include, e.g., a top axis camera and a bottom axis camera. The top axis camera is coupled to a top surface of the first rigid plate, and the bottom axis camera is coupled to a bottom surface of the second rigid plate. In some embodiments, both the top axis camera and the bottom axis camera are arranged such that the optical axis of each camera is collinear with the alignment axis. In some embodiments, the plurality of axis cameras may include additional cameras coupled to the top surface of the first rigid plate, coupled to the bottom surface of the second rigid plate, or both. In some embodiments, one or more additional axis cameras may be positioned to provide stereo imaging with the top axis camera, the bottom axis camera, one or more peripheral camera, an additional axis camera, or some combination thereof.

The plurality of peripheral cameras and one or more axis cameras are configured to capture image information of a local area. The camera system sends the image information to a processing server, which generates 3D-360 degree content of the local area from the image information. The 3D-360 degree content is media content associated with a 360-degree field of view of the camera system and which may be rendered in 3D, e.g., an image, a video, audio information, or some combination thereof.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
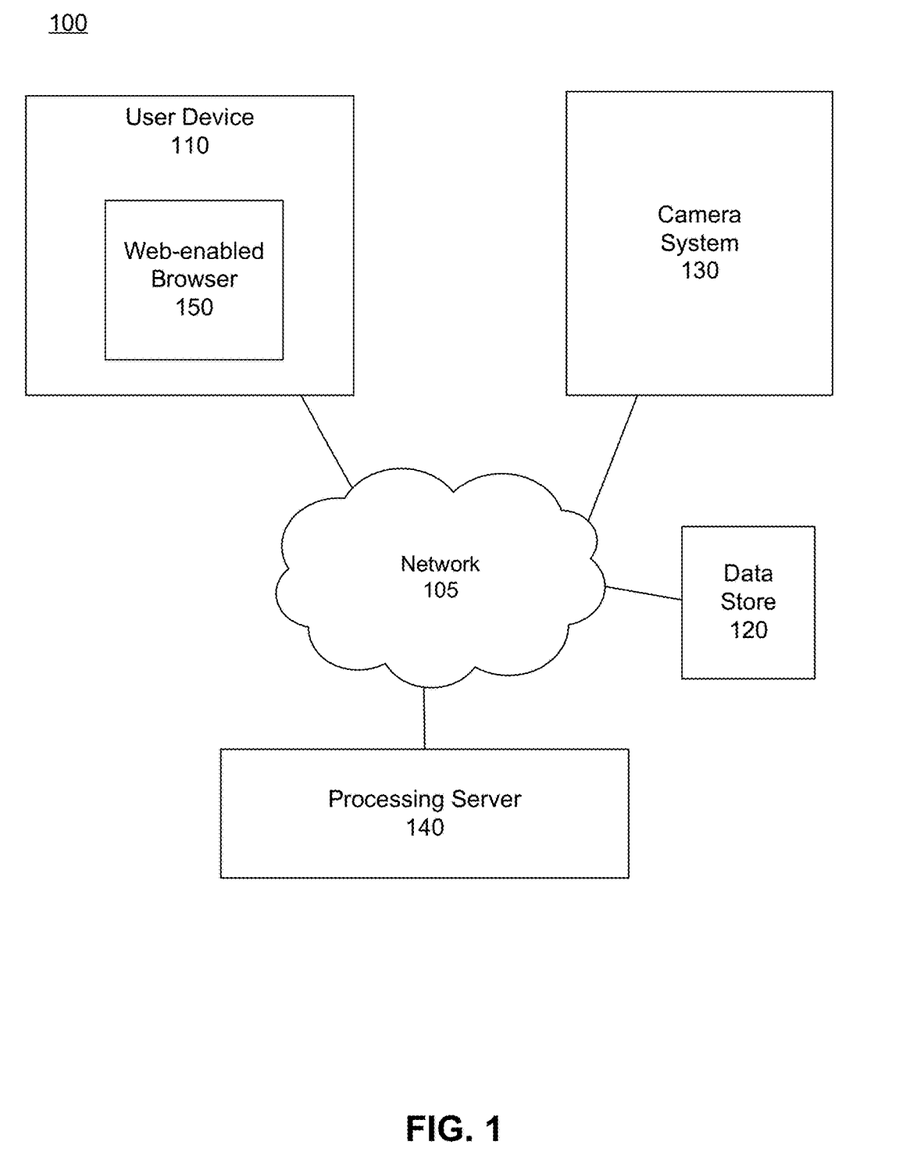
FIG. 1 is a high-level block diagram illustrating an embodiment of a system for generating 3D-360 degree images for a virtual reality system, according to an embodiment.

FIG. 1 is a high-level block diagram illustrating an embodiment of a system 100 for generating 3D-360 degree images for a virtual reality system, according to an embodiment. The system 100 includes a network 105 that connects a user device 110 to a data store 120, a camera system 130, and a processing server 140. In the embodiment of FIG. 1, only one user device 110 is illustrated, but there may be multiple instances of this entity. For example, there may be multiple user devices 110 coupled, via the network 105, to the data store 120, the camera system 130, and the processing server 140.

The network 105 provides a communication infrastructure between the user devices 110, the data store 120, the camera system 130, and the processing server 140. The network 105 is typically the Internet, but may be any network, including but not limited to a Local Area Network (LAN), a Metropolitan Area Network (MAN), a Wide Area Network (WAN), a mobile wired or wireless network, a private network, or a virtual private network.

The user device 110 is a computing device that executes computer program modules—e.g., a web-enabled browser 150 or some other client application—which allow a user to view a user interface for the camera system 130. A user device 110 might be, for example, a personal computer, a tablet computer, a smart phone, a laptop computer, or other type of network-capable device.

The data store 120 stores image information from the camera system 130 and the processing server 140. In some embodiments, the data store 120 can be cloud-based and is accessed by the camera system 130 and the processing server 140 via the network 105. The data store 120 may receive and store image information directly from the camera system 130, or the data store 120 may receive and store image information from the processing server 140 after the image information has been processed. In one embodiment, the data store 120 is a part of the processing server 140. In another embodiment, the data store 120 is an archive maintained by a third-party storage provider.

The camera system 130 generates image information using captured images and/or audio information of a local area surrounding the camera system 130. The camera system 130 comprises an assembly of cameras positioned to capture a 360 degree view of the local area. In the embodiment of FIG. 1, the assembly includes a plurality of cameras mounted to a rigid surface or structure. At least a portion of the plurality of cameras are arranged such that adjacent cameras may produce stereo images of the local area. Embodiments of the camera system 130 are discussed in detail below with regard to FIGS. 2A, 2B, 2C, 2D, and 3.

The local area is the environment that surrounds the camera system 130. For example, the local area may be a room that the camera system 130 is inside, or the camera system 130 may be outside and the local area is an outside area that is visible to the camera system 130. Image information is information output by the camera system 130. Image information may include, e.g., one or more images, audio information (e.g., sounds captured by one or more microphones), video information, metadata, or some combination thereof. Metadata is additional information associated with the image information. Metadata may include, e.g., frame rate, exposure settings (e.g., shutter speed, gain, etc.), copyright information, date/time information, camera identifier, names, labeling, some other information associated with the image information, or some combination thereof. The camera system 130 includes memory storage that buffers and stores the image information. In some embodiments, the camera system 130 may be locally coupled to (e.g., via some wired and/or wireless connection) an external data store. In some embodiments, the camera system 130 is configured to send the image information to the processing server 140 via the network 105. In alternate embodiments, the camera system 130 is configured to process the image information to form 3D-360 degree content at a high resolution. For example, 3D-360 degree content video content may be at, e.g., 4K, 6K, 8K resolution, or some other resolution supported by the camera system 130.

The camera system 130 receives instructions from a user to capture image information of the local area. For example, the camera system 130 can include a web server that allows users to control the camera system 130 using, e.g., the web-enabled browser 150 on the user device 110 via the network 105. The camera system 130 determines a global exposure setting (e.g., gain, shutter speed, aperture) using information from one or more cameras in the camera assembly 130, and applies the global exposure setting to all of the cameras in the camera system 130. Accordingly, each camera, regardless of a light metering specific to that camera, uses the global exposure settings. The camera system 130 synchronizes the capture of the image information using a global shutter that causes all of the cameras in the camera system 130 to take an exposure (using the global exposure setting) at the same time. Accordingly, both exposure and time a frame is taken is consistent across all of the image information.

The processing server 140 generates 3D-360 degree content using image information. 3D-360 degree content is media content associated with a 360 degree field of view of the camera system 130 and at least a portion of which includes depth information and may be rendered in three dimensions (3D). 3D-360 degree content may include, e.g., an image, a video, audio information, or some combination thereof. The processing server 140 may generate the 3D-360 degree content in high resolution. For example, 3D-360 degree content video content may be at, e.g., 4K, 6K, 8K resolution, or some other resolution supported by the camera system 130. For example, 3D-360 degree content may be a video of the local area, the video being a merged representation of the images taken by the camera system 130, and which renders in 3D portions of the video corresponding to images taken by the peripheral cameras.

The processing server 140 receives the image information from the camera system 130, the data store 120, or some combination thereof. The processing server 140 is configured to create 3D-360 degree content with an algorithm performed by a set of computer-implemented instructions. The algorithm identifies a set of images in the image information associated with a same time value (e.g., metadata indicates captured at the same time), and merges the images into a single frame of 3D-360 degree content. Additionally, the processing server 140 may generate video files by coupling together multiple frames of 3D-360 degree content associated with different times. The 3D-360 degree content is output by the processing server 140 and can be stored in the data store 120 for access at a later time.

The system 100 beneficially allows a user to capture image information of a local area and construct 3D-360 degree content of the local area that may be used in, e.g., a virtual reality (VR) environment, or some other environment (e.g., augmented reality and/or mixed reality). The system 100 has a rigid structure, a synchronous operation, and a web-based interface. The rigidity of the camera system 130 prevents the plurality of cameras from moving with respect to each other once each camera has been aligned and calibrated, making it easier to process the image information and fuse the images together to construct the 3D-360 degree content. The synchronicity of the plurality of cameras allows for global settings to be applied to each camera and improves the quality of the image information captured, which, in turn, improves the quality of the 3D-360 degree content that is constructed. The web-based interface provides ease-of-use for a user to set up the system 100, preview captured image information, apply global settings, process image information, and access, use, or store 3D-360 degree content.

Figure 2A:
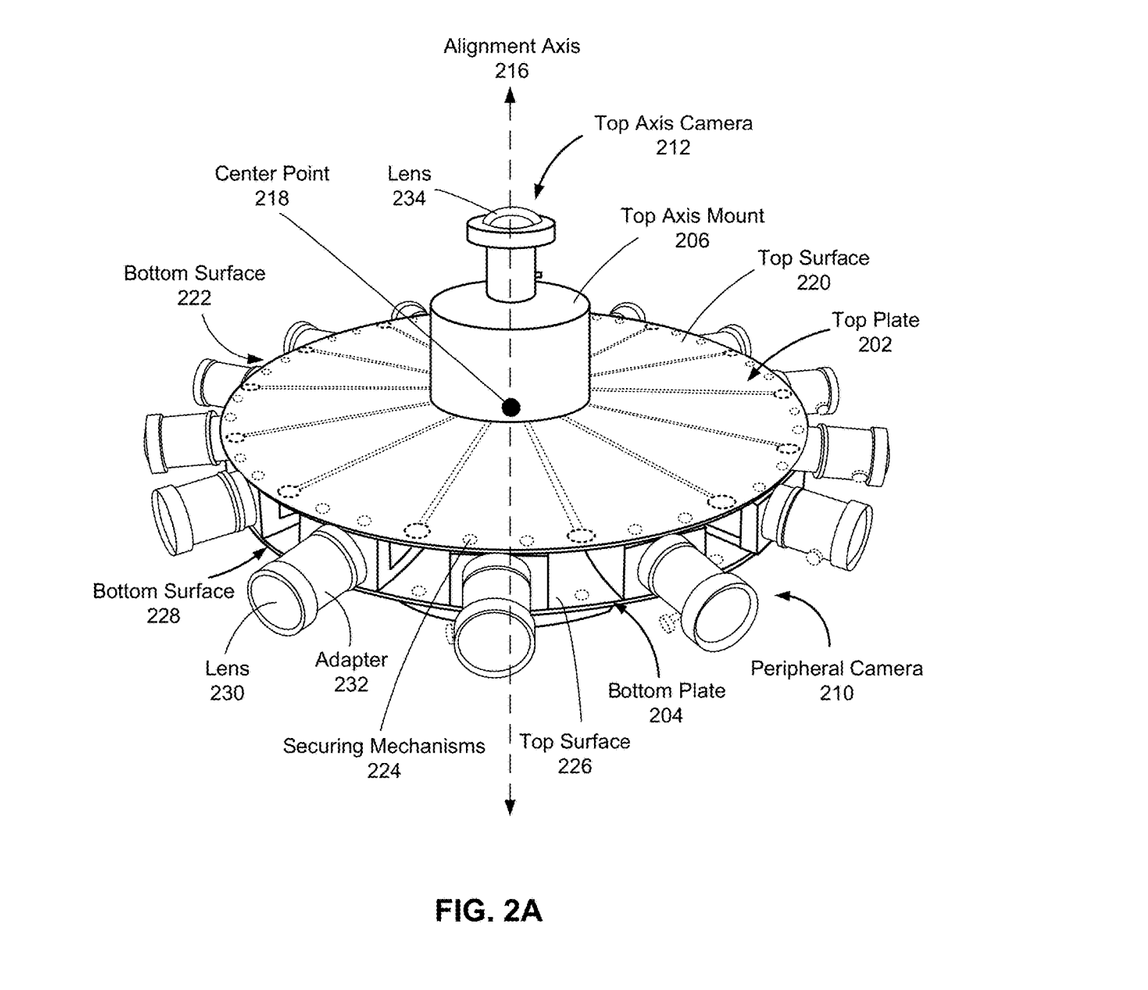
FIG. 2A illustrates a perspective view of a camera assembly for capturing image information, according to an embodiment.

FIG. 2A illustrates a perspective view of a camera assembly 200 for capturing image information, according to one embodiment. In some embodiments, the camera assembly 200 is an embodiment of the camera assembly 130 in system 100. Alternatively, the camera assembly 200 may be part of some other system. Some embodiments of the camera assembly 200 have different components than those described here. Similarly, in some cases, functions can be distributed among the components in a different manner than is described here.

As described in greater detail below, the camera assembly 200 generates image information using captured images and/or audio information of a local area. The camera assembly 200 includes a top plate 202, a bottom plate 204, a top axis mount 206, a bottom axis mount 208 (not shown), a plurality of peripheral cameras 210, and a plurality of axis cameras including a top axis camera 212 and a bottom axis camera 214 (not shown). The top plate 202, the bottom plate 204, the top axis mount 206, the bottom axis mount 208 (not shown), the top axis camera 212, and the bottom axis camera 214 (not shown) are aligned along an alignment axis 216.

The plurality of peripheral cameras 210 are arranged such that they form a ring around a center point 218 that is bisected by the alignment axis 216. The top plate 202 couples to a top surface of the ring of peripheral cameras 210, and the bottom plate 204 couples to a bottom surface of the ring of peripheral cameras 210. This configuration creates a rigid structure that prevents vibration and overheating of the peripheral cameras 210 and allows the peripheral cameras 210 to capture quality images and/or video that are used to generate the portion of 3D content in the 3D-360 degree content.

The top plate 202 is configured to secure the plurality of peripheral cameras 210 and one or more axis cameras (e.g., top axis camera 212). The top plate 202 includes a top surface 220, a bottom surface 222, and a plurality of securing mechanisms 224. The top plate 202 is composed of a rigid material and is substantially disk-shaped. The rigid material may be, e.g., a metal (e.g., aluminum, steel, etc.), a rigid plastic, some other rigid material, or some combination thereof. The top surface 220 couples a top axis mount 206 to the top plate 202, such that the top axis mount 206 is centered along the alignment axis 216. Along the periphery of the top plate 202 are the plurality of securing mechanisms 224. Each securing mechanism 224 is configured to secure a peripheral camera 210 to the bottom surface 222 of the top plate 202. For example, the securing mechanisms 224 may be mechanical fasteners (e.g. screws, bolts) that couple the top plate 202 to the plurality of peripheral cameras 210.

The bottom plate 204 is configured to secure the plurality of peripheral cameras 210 and one or more axis cameras (e.g. bottom axis camera 214) and is substantially similar to the top plate 202. The bottom axis camera 214 is not shown in FIG. 2A but is illustrated as axis camera 214 in FIG. 2C. The bottom plate 204 includes a top surface 226, a bottom surface 228, and a plurality of securing mechanisms 224. The bottom plate 204 is composed of a rigid material and is substantially disk-shaped. The rigid material may be, e.g., a metal (e.g., aluminum, steel, etc.), a rigid plastic, some other rigid material, or some combination thereof. The bottom surface 228 is configured to couple a bottom axis mount 208 (not shown in FIG. 2A) to the bottom plate 204, such that a bottom axis mount 208 is centered along the alignment axis 216. Along the periphery of the bottom plate 204 are an additional plurality of securing mechanisms 224, wherein each securing mechanism 224 secures a peripheral camera 210 to the top surface 226 of the bottom plate 204. The bottom surface 228 is further configured to couple to a support structure that provides standing or mounting support and stability for the camera system 130. The support structure can be a variety of mounts (e.g. monopod, tripod, quadrantpod, wall mount, etc.).

The axis mounts are configured to secure an axis camera (e.g. top axis camera 212 or bottom axis camera 214) perpendicular to a surface of the top plate 202 or the bottom plate 204. The axis mounts are substantially cylindrical and hollow within. This configuration allows an axis camera to be vertically offset from the surface of the top plate 202 or the bottom plate 204, allowing for less overlap of the field of views of the axis cameras 212, 214 and the peripheral cameras 210. Wires connecting to the axis cameras may be hidden within the hollow portion of the axis mounts. In the embodiment of FIG. 2A, the top axis mount 206 is coupled to the top surface 220 of the top plate 202, and the bottom axis mount 208 is coupled to the bottom surface 214 of the bottom plate 210. Each axis mount is aligned along the alignment axis 216 and provides stability for an axis camera.

The peripheral cameras 210 are configured to capture images and/or video of a 360 degree view of the local area. The peripheral cameras 210 are positioned such that they form a ring around the center point 218 that is bisected by the alignment axis 216. The plurality of peripheral cameras 210 are positioned around the center point 218 such that an optical axis of each peripheral camera 210 is within a plane, and a field of view of each peripheral camera 210 faces away from the center point 218. Each peripheral camera 210 is positioned next to the adjacent peripheral camera 210 at a certain distance and at a certain angle. This configuration allows the captured images and/or video, once processed into 3D-360 content to include stereoscopic (also referred to as stereo) portions. In some embodiments, the distance simulates an inter-pupillary distance between the human eyes. The simulated inter-pupillary distance is dependent on the amount of overlap between horizontal fields of view of adjacent peripheral cameras 210. The amount of overlap is a function of the horizontal field of view of each peripheral camera 210 after correcting for barrel distortion and of the angular spacing or number of peripheral cameras 210 in the ring configuration. For example, an embodiment that simulates greater than 6.4 cm inter-pupillary distance (which is approximately the median value for inter-pupillary distance of humans) consists of fourteen peripheral cameras evenly spaced, each with horizontal field of view greater than or equal to 77 degrees after correcting for barrel distortion. This configuration allows the captured images and/or video to simulate a human's perception of vision. The number of peripheral cameras 210 may vary and can depend on the size of the top plate 202 and the bottom plate 204, and/or a field of view of each of the peripheral cameras 210. In the embodiment of FIG. 2A, there are fourteen peripheral cameras 210 which form the ring and capture a 360 degree view of the environment. In other embodiments, there may be more or less peripheral cameras 210.

A peripheral camera 210 includes a sensor (not shown), a lens 230, and a camera controller (not shown). The sensor is an electrical device that captures light using an array of photo-sensitive pixels, wherein each pixel converts light into an electronic signal. Sensors can have varying features, such as resolution, pixel size and sensitivity, light sensitivity, type of shutter, and type of signal processing. The lens 230 is one or more optical elements of a camera that facilitate focusing light on to the sensor. Lenses have features that can be fixed or variable, such as the focus and the aperture, may have varying focal lengths, and may be covered with an optical coating. Some embodiments may have lenses that are interchangeable, such that a first lens can be removed from the camera and a second lens can be coupled to the camera. In some embodiments, the peripheral camera 210 may have a microphone to capture audio information. The microphone can be located within the camera or may located external to the camera.

The camera controller is able to determine exposure settings (e.g. aperture, gain, shutter) for the camera based on light incident on the sensor. In some embodiments, the camera controller acts as a principal camera, i.e. the camera controller controls a plurality of other cameras. In other embodiments, the camera controller acts as an ancillary camera, i.e. the camera controller is controlled by a second camera. The embodiments in which the peripheral cameras 210 act as ancillary cameras, the shutter and exposure settings are set globally by a principal camera. In the embodiment of FIG. 2A, the peripheral camera 210 includes several properties, such as a small form factor, high resolution (e.g., 2048×2048), a high frame rate (e.g., 90 frames per second), a 1" sensor, and a C-mount for a lens. A field of view ranging from ~50 to 120 degrees is generally referred to as a wide field of view, and a field of view larger than 120 degrees is generally referred to as a fish eye field of view. The field of view of each peripheral camera 210 can range from a wide angle to a fish eye field of view. For example, the field of view of each peripheral camera 210 may range between 50-180 degrees. In the embodiment of FIG. 2A, the lens 230 has an optical coating that blocks infrared light, a f/2.4 aperture, a CS-mount for a camera, and a horizontal and vertical field of view of 92 degrees. The effective field of view of the lens 230 is 77 degrees after correction for barrel distortion. In other embodiments, each of the peripheral cameras 210 may have a different field of view. For example, each of the peripheral cameras 210 may have a 180 degree field of view (i.e., a fish eye lens). Extremely wide fields (i.e., fish eye) of views have the potential to reduce the number of peripheral cameras used to generate stereoscopic portions of the 3D-360 degree content, however, processing of the image information becomes more difficult as the image information tends to include larger amounts of distortion.

An adapter 232 allows for the use of off-the-shelf components in the camera assembly 200. The adapter 232 is configured to couple the peripheral camera 210 to the lens 230 by securing to the C-mount of the peripheral camera 210 at a first end and securing to the CS-mount of the lens 230 at a second end.

Each peripheral camera 210 further includes a plurality of securing mechanisms to secure the peripheral camera 210 between the top plate 202 and the bottom plate 204. The securing mechanisms are reciprocal to the securing mechanisms 224, allowing the peripheral camera 210 to couple to the bottom surface 222 of the top plate 202 and to couple to the top surface 220 of the bottom plate 204. In the embodiment of FIG. 2A, each of the peripheral cameras 210 is positioned such that the lens 230 points radially outward from the center point 218. The peripheral cameras 210 may be battery-powered, powered via cables and a cable interface (e.g. a universal serial bus (USB) interface), or some combination thereof. Additionally, some embodiments may have support structures mounted between the top plate 202 and the bottom plate 204 to increase rigidity and stability of the camera assembly 200. The support structures may be posts, support blocks, or some combination thereof.

The plurality of axis cameras are configured to capture images and/or video of top and bottom views of the local area. The axis cameras include a top axis camera 212 and a bottom axis camera 214 (shown in FIG. 2C) that are secured to their respective axis mounts 206, 208 and positioned such that both the top axis camera 212 and the bottom axis camera 214 are aligned along the alignment axis 216 such that an optical axis of each axis camera 212, 214 is collinear with the alignment axis 216. The field of view of the top axis camera 212 and the field of view of the bottom axis camera 214 are directed away from the center point 218 of the camera assembly 200.

Figure 2B:
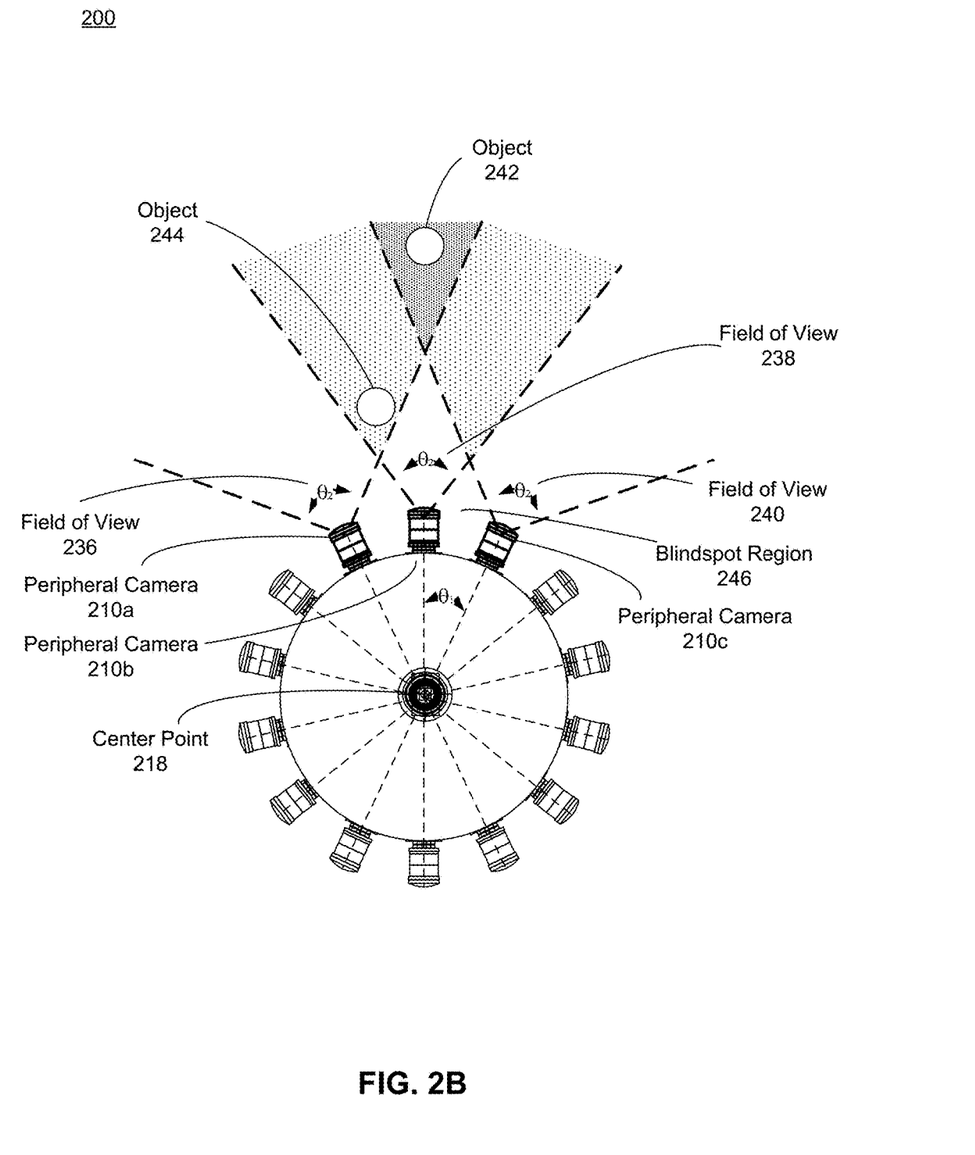
FIG. 2B illustrates a top-down view of the camera assembly shown in FIG. 2, according to an embodiment.
Figure 2C:
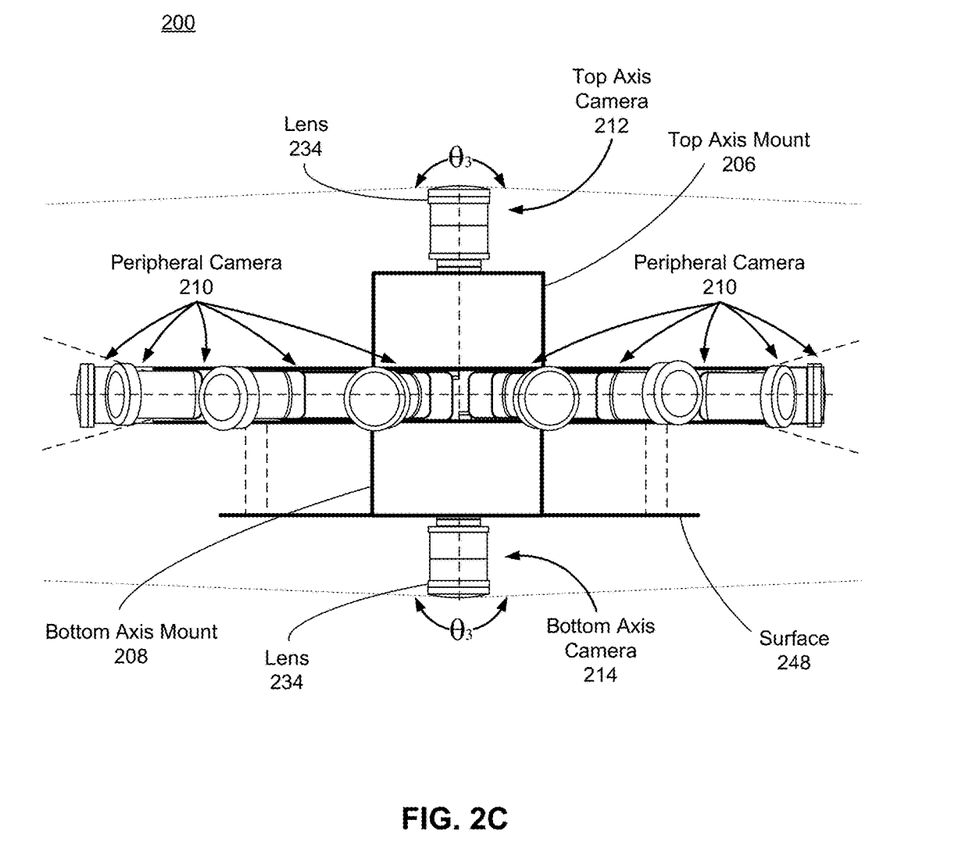
FIG. 2C illustrates a side view of the camera assembly shown in FIG. 2, according to an embodiment.

The top axis camera 212 provides a top view of a portion of the local area, while a bottom axis camera 214 (as illustrated in FIG. 2C) provides a bottom view of a different portion of the local area. As previously described, the top and bottom axis cameras 212, 214 are vertically offset relative to the peripheral cameras 210 to limit the overlap between the fields of view. The number and orientation of axis cameras may vary. In the embodiment of FIG. 2A, there are two axis cameras which capture a top and bottom view of the local area. In alternate embodiments (e.g., as discussed in relation to FIG. 2D), the camera assembly 200 includes two bottom axis cameras, which are arranged such that the field of view of the first bottom axis camera and the field of view of the second bottom axis camera have sufficient overlap to remove the mount that supports the camera assembly 200 as an occlusion in the 3D-360 degree content. In other embodiments, the top plate 202 and the bottom plate 204 may each secure a plurality of axis cameras, such that the arrangement of the axis cameras covers a hemisphere and provides a spherical field of view.

An axis camera includes a sensor (not shown), a lens 234, and a camera controller (not shown). The sensor is an electrical device that captures light using an array of photosensitive pixels, wherein each pixel converts light into an electronic signal. Sensors can have varying features, such as resolution, pixel size and sensitivity, light sensitivity, type of shutter, and type of signal processing. The lens 234 includes one or more optical elements of a camera that facilitates focusing light on the sensor. Lenses have features that can be fixed or variable, such as the focus and the aperture, may have varying focal lengths, and may be covered with an optical coating. Some embodiments may have lenses that are interchangeable, such that a first lens can be removed from the camera and a second lens can be coupled to the camera. In some embodiments, the axis cameras may have a microphone to capture audio information. The microphone can be located within the camera or may be located external to the camera.

The camera controller is able to determine exposure settings (e.g. aperture, gain, shutter) for the camera and controls the frame rate. In some embodiments, the camera controller acts as a principal camera, i.e. the camera controller controls a plurality of other cameras. In other embodiments, the camera controller acts as an ancillary camera, i.e. the camera controller is controlled by a second camera. The embodiments in which the axis cameras act as ancillary cameras, the shutter and exposure settings are set globally by a principal camera. In the embodiment of FIG. 2A, the axis cameras include several properties, such as a small form factor, high resolution (e.g. 2048×2048), a high frame rate (e.g., 90 frames per second), a 1" sensor, and a C-mount for a lens. The field of view (FOV) of each axis camera can range between 120-185 degrees. In alternate embodiments, the FOV of the axis cameras could also be less than 120 or greater than 185. At minimum, it must be large enough to cover the holes left by the peripheral cameras 210. For example if a peripheral camera 210 has vertical FOV x degrees, in order to image the holes in coverage, the axis cameras should have a FOV of 2*(90−x) degree. In some embodiments, a larger FOV may be used to ensure sufficient overlap to enable a smooth transition in the 3D-360 degree content from a portion corresponding to image information from the axis cameras to a portion corresponding to image information from the peripheral cameras 210.

In the embodiment of FIG. 2A, a lens 234 has an optical coating that blocks infrared light, a f/1.8-16 aperture, a C-mount for a camera, and a horizontal and vertical field of view of 185 degrees. The axis cameras may be battery-powered, powered via cables and a cable interface (e.g. a USB interface), or some combination thereof.

The camera assembly 200 captures image information using the plurality of peripheral cameras 210 and axis cameras that are positioned to view 360 degrees of a local area. The settings of the camera assembly 200 can be previewed and modified remotely by a user. The image information can be sent to the data store 120 or to the processing server 140 to generate 3D-360 degree content.

FIG. 2B illustrates a top-down view of the camera assembly 200 shown in FIG. 2, according to an embodiment. FIG. 2B demonstrates the configuration of the peripheral cameras 210 and highlights a field of view 236, field of view 238, and a field of view 240, as seen by three peripheral cameras 210a, 210b, and 210c, respectively. An object 242 and an object 244 in the local area are viewed by the peripheral cameras 210a, 210b, and 210c. The illustration in FIG. 2B is used for reference and may not be illustrated to scale.

As described with regards to FIG. 2A, the peripheral cameras 210 are arranged such that they create a ring around the center point 218, with the lens 230 pointing outwards from the center point 218 bisected by the alignment axis 216. Each peripheral camera 210 is separated from any adjacent peripheral camera 210 by a spacing distance. The spacing distance is the distance between sensors of adjacent peripheral cameras 210. In some embodiments, the spacing distance is approximately the same as an inter-pupillary distance of human eyes. This configuration allows the captured images and/or video to simulate how a human would perceive the imaged portions of the local area.

The peripheral cameras 210 are positioned in a ring configuration; accordingly, each camera is at a slight angle, $\theta_1$, relative to adjacent cameras. For example, in some embodiments, the angle $\theta_1$ is 25.71 degrees, which allows for significant overlap between the fields of view of the peripheral cameras 210. The angle, $\theta_1$, and the field of views of each peripheral camera 210 are configured such that an object in the local area imaged by the peripheral cameras 210 can be seen by at least two peripheral cameras 210. As illustrated in FIG. 2B, the fields of view 236, 238, 240 for the peripheral cameras 210a, 210b, 210c, respectively, begin to overlap at a threshold distance; the overlapping fields of view are represented by the shaded regions. In the embodiment of FIG. 2B, each peripheral camera 210 has a field of view of $\theta_2$, which is 77 degrees. The regions between the fields of view 236, 238, 240 are a blindspot region 246 in which the objects are not viewed by any peripheral camera 210.

The threshold distance is the distance at which objects in the local area can be viewed by at least two peripheral cameras 210. The threshold distance varies throughout the local area, depending on the size of $\theta_1$. For example, an object 242 is at a first distance from the center point 218 and can be viewed by three peripheral cameras 210a, 210b, and 210c; however, an object 244 is located at a second distance that is less than the first distance and is within the field of view of both the peripheral camera 210a and the peripheral camera 210b. The peripheral cameras 210 and the axis cameras are positioned such that every object in the environment past a threshold distance can be viewed by at least two peripheral cameras 210. This configuration allows the camera assembly 200 to view objects in the local area from multiple angles and to capture image information with significant overlap, enabling the system 100 to reconstruct high quality 3D-360 degree images and/or video.

FIG. 2C illustrates a side view of the camera assembly 200 shown in FIG. 2, according to an embodiment. As described with regards to the embodiment of FIG. 2A, the lens 234 is a fisheye lens that has a wide angle $\theta_3$ field of view. In the embodiment of FIG. 2C, the angle $\theta_3$ is 185 degrees, which can vary in other embodiments. The lenses 234 are configured to have wide coverage of the top and bottom areas of an environment and provide sufficient overlap with the fields of view of the peripheral cameras 210, such that a high quality 3D-360 degree image can be created. In some embodiments, a surface 248 can be a support structure for the camera assembly 200 to rest on a table or to couple to a camera mount or stand.

Figure 2D:
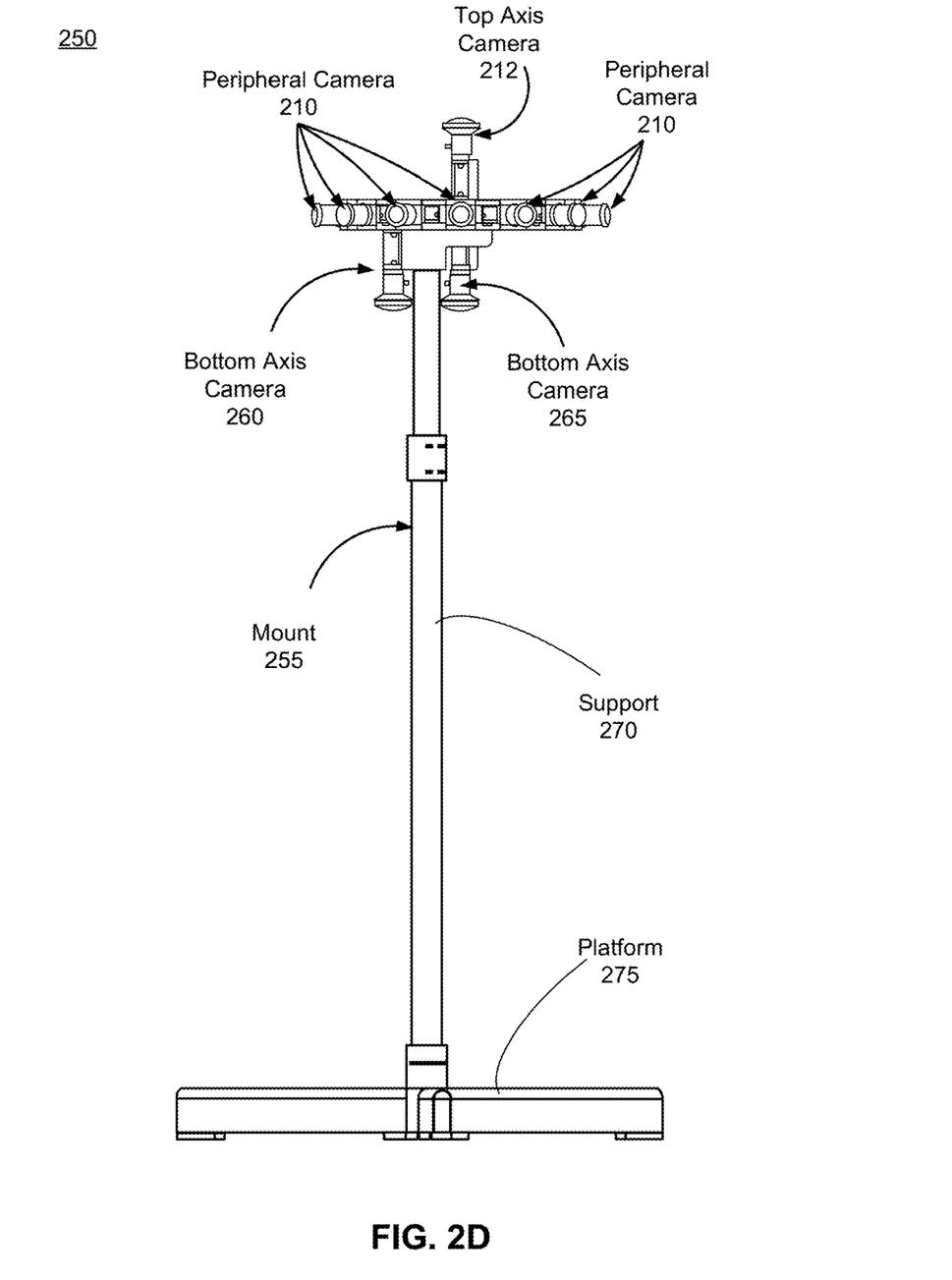
FIG. 2D illustrates a side view of a camera assembly for capturing image information, according to one embodiment.

FIG. 2D illustrates a side view of a camera assembly 250 for capturing image information, according to one embodiment. In some embodiments, the camera assembly 250 is an embodiment of the camera assembly 130 in system 100. Alternatively, the camera assembly 250 may be part of some other system. Some embodiments of the camera assembly 250 have different components than those described here. Similarly, in some cases, functions can be distributed among the components in a different manner than is described here.

The camera assembly 250 is substantially the same as the camera assembly 200, except that the camera assembly 250 includes a mount 255 and two bottom axis cameras 260, 265. The mount 255 supports the camera assembly 250. The mount 255 includes a support 270 and a platform 275. The support 270 transfers the load of the camera assembly 250 to the platform 275 in a stable manner (i.e., minimal vibration). In this embodiment, the support 270 is a single rod that couples the platform 275 to the camera assembly 250. In other embodiments, the support 270 may include a plurality of rods, or other means of support from the platform 275 to the camera assembly 250. The support 275 may be composed of, e.g., wood, metal, plastic, etc.

The platform 275 is a stable foundation for the support 270 and the camera system 250. In this embodiment, the platform 275 is simply three legs spaced apart from each other. The platform 275 may be composed of, e.g., wood, metal, plastic, etc. Note, in alternate embodiments, other mounts may be used.

The bottom axis cameras 255, 260 are substantially the same as the bottom axis camera 214. The bottom axis cameras 255, 260 are arranged such that a field of view of the bottom axis camera 255 and a field of view of the bottom axis camera 260 have sufficient overlap to remove some or all of the mount 265 (e.g., portions of the support 270) as an occlusion in the 3D-360 degree content.

Figure 3:
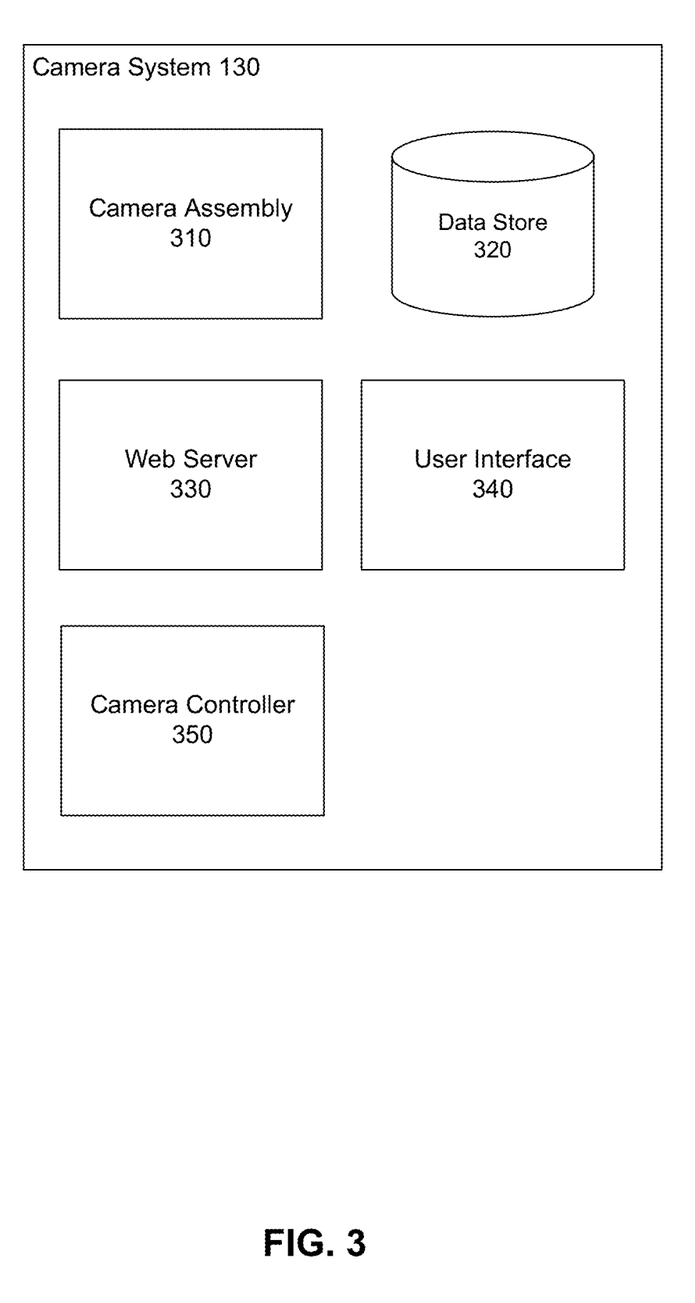
FIG. 3 is a high-level block diagram illustrating a detailed view of modules within a camera system, according to one embodiment.

FIG. 3 is a high-level block diagram illustrating a detailed view of modules within the camera system 130, according to one embodiment. Some embodiments of the camera system 130 have different modules than those described here. Similarly, the functions can be distributed among the modules in a different manner than is described here. The camera system 130 is comprised of modules including a camera assembly 310, a data store 320, a web server 330, a user interface 340, and a camera controller 350.

The camera assembly 310 captures image information using a plurality of cameras that are positioned to view 360 degrees of a local area. In some embodiments, the camera assembly 310 is an embodiment of the camera assembly 200. Alternatively, the camera assembly 310 may be some other camera assembly configured to capture a plurality of images that cover 360 degrees and at least a portion of which is captured in stereo. The image information may include, e.g., one or more images, audio information, video information, metadata, or some combination thereof. The image information can be captured in various file formats for images (e.g. .jpeg, .tif, .png, etc.), audio (e.g. .aac, .mp3, .wav, etc.), and/or video (e.g. .mpg, .mov, .wmv, etc.). The camera assembly 310 captures the image information responsive to instructions from the camera controller 350. In some embodiments, the camera assembly 310 ensures that the image information captured from each peripheral camera 210 and axis camera is consistent and allows for the construction of uniform, natural-looking 3D-360 degree content. The camera assembly 310 captures and sends some or all of the image information to, e.g., the user interface 340, the data store 320, the processing server 130, the data store 120, or some combination thereof.

The data store 320 of the camera system 130 is a local memory storage that stores image information. The data store 320 receives and stores the image information from the camera assembly 310. In some embodiments, the data store 320 may upload image information to, e.g., an external data store (e.g., data store 120), a processing server (e.g., processing server 130), or some combination thereof. In some embodiments, the data store 320 acts as a buffer. For example, the camera system 130 may generate image information at a rate that exceeds an upload rate to an external data store and/or a processing server. Accordingly, the data store 320 may temporarily buffer the image information to ensure that the upload rate does not exceed to the external data store and/or a processing server.

The web server 330 serves as a network 105 interface of the camera system 130. The web server 330 transfers data from the camera assembly 310 through the network 105 to the user device 110, the processing server 140, some other entity, or some combination thereof. In some cases, the camera assembly 310 may transfer data to the web server 330 using a wired interface (e.g., USB). The data can be compressed or uncompressed.

The user interface 340 allows a user to interface with the camera system 130. In some embodiments, the user interface 340 is a graphical user interface (GUI). An example user interface is described in detail below with regard to FIG. 5. The user interface 340 allows a user to preview data captured by the camera assembly 310 and to control the settings of the camera assembly 310. In some embodiments, the user interface 340 may be accessed through a network connection on a mobile phone, tablet, PC, etc. or any other device that has a network connection. In alternate embodiments, the user interface 340 may include a display and one or more input/output devices (e.g., mouse keyboard) that are directly coupled to the camera assembly 310.

The camera controller 350 is configured to control the operation of the camera assembly 310. In the embodiment of FIG. 3, the camera assembly 310 is configured to have one camera act as a principal camera, and the additional cameras act as ancillary cameras. The principal camera is the camera in which the camera controller acts as the master of a plurality of other cameras. The ancillary camera is the camera in which the camera controller acts as the slave to the master camera. The principal camera may be any peripheral camera 210 or axis camera; in the embodiment of FIG. 3, the principal camera is the top axis camera 212 coupled to the top plate 202. The camera controller 350 controls exposure settings for cameras in the camera assembly 310. The exposure of a camera determines how light or dark an image will appear when captured by a camera. The exposure settings may include, e.g., aperture size, shutter speed, gain, or some combination thereof. The aperture size controls the amount of light that reaches the sensor. The shutter speed is the length of time that the sensor is exposed to light. The gain is the sensitivity of the sensor to the light. In some embodiments, the camera controller 350 instructs the camera assembly 310 to determine exposure settings for each of the cameras in the camera assembly 310. The camera controller 350 determines a global exposure setting using the determined exposure settings, and provides the global exposure setting to all of the cameras in the camera assembly 310. A global exposure setting is a single exposure setting that is applied to all of the cameras in the camera assembly 310. In alternate embodiments, the camera controller 350 instructs the principal camera to determine its exposure setting, and then sets the determined exposure setting as a global exposure setting and provides the global exposure setting to all of the cameras in the camera assembly 310. A global exposure setting provides for uniform exposure across all of the plurality of peripheral cameras 210 and axis cameras. Without a global exposure setting, each camera in the camera assembly 310 may capture image information at different exposure settings, causing some images to appear lighter or darker than other images. This may create inconsistencies between individual images when the images are stitched together to construct the 3D-360 degree content. Uniform exposure assists in creating natural looking images and/or video in 3D-360 degree content.

The camera controller 350 controls a global shutter of the camera assembly 310. A global shutter links the shutter of each camera in the camera assembly 310, such that each shutter opens at the same time (i.e. within less than 1 millisecond of one another), allowing the camera assembly 310 to capture synchronous image information. The camera controller 350 may instruct a principal camera to provide a master trigger signal to the ancillary cameras in the camera assembly 310. The master trigger signal commands the shutter of each ancillary camera to open at the same time as the shutter of the principal camera. The peripheral cameras 210 and the axis cameras within the camera assembly 310 may be connected with generator locking cables (e.g. USB 3.0 generator locking cables) to ensure that data is captured synchronously. Capturing synchronous image information ensures that individual images match and can be accurately stitched together by the processing server 140 to construct the 3D-360 degree content.

Figure 4:
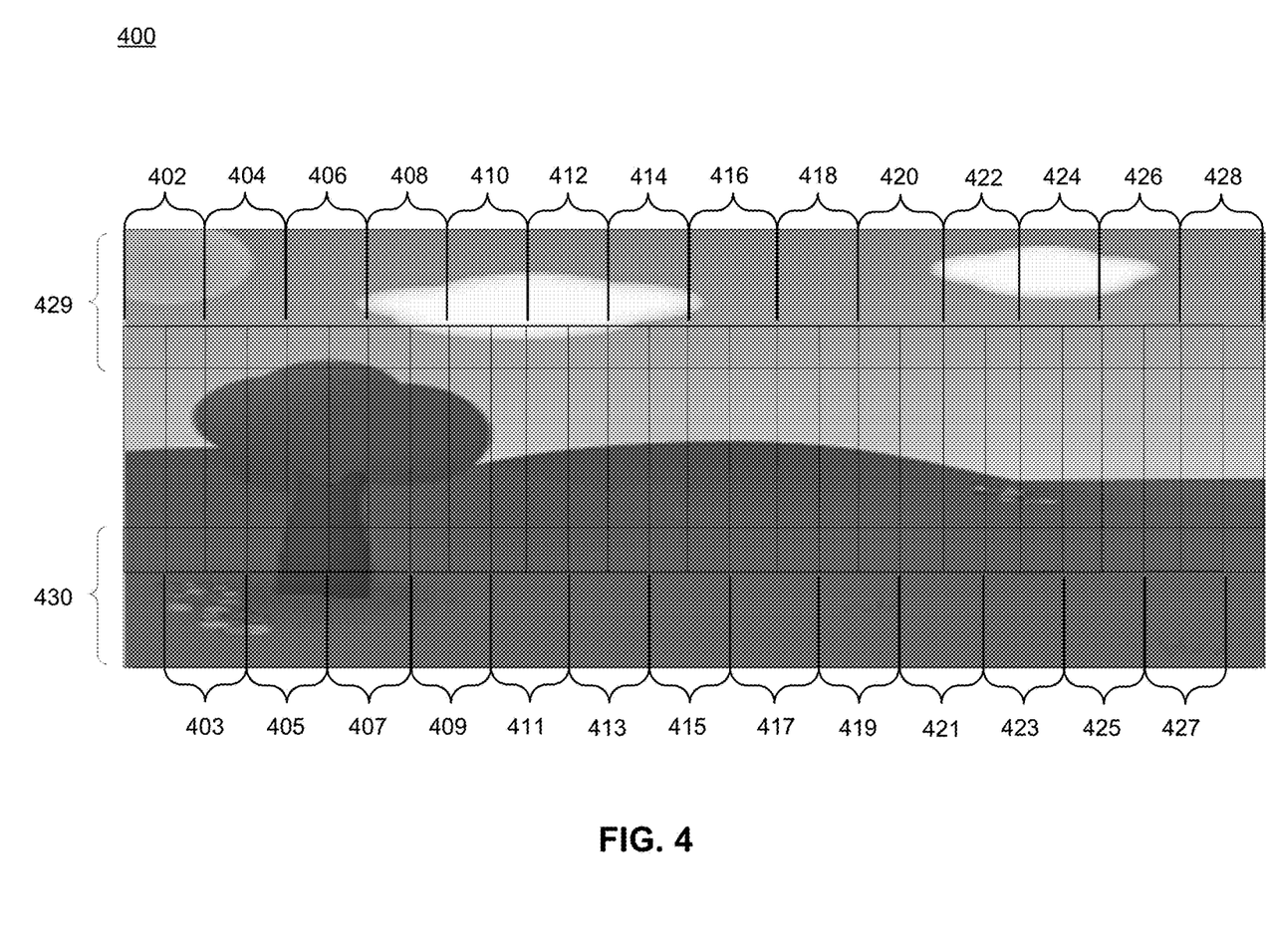
FIG. 4 illustrates 3D-360 degree content generated from image information, according to one embodiment.

FIG. 4 illustrates 3D-360 degree content generated from image information, according to one embodiment. In the embodiment of FIG. 4, the 3D-360 degree content is a constructed image 400 that was generated using individual image frames 402-430. The individual image frames 402-430 were processed by the processing server 140 and constructed to form a 360 degree image that is in 3D for portions of the image generated from frames 402-430.

The frames 402-428 were captured by the plurality of peripheral cameras 210, wherein an individual frame is captured by one peripheral camera 210. Each frame 402-428 includes a two-dimensional (2D) portion of the local area. Combining images that capture a local area from multiple 2D perspectives into a single image allow the objects within the image to appear 3D. When individual frames captured by a camera assembly with a 360 degree view of a local area, such as frames 402-428, are combined, it results in the constructed image 400 that illustrates a 3D-360 degree view of the local area. Each frame 402-430 includes a region where it overlaps with respective adjacent frames, as illustrated in FIG. 4. The overlapping regions of the frames 402-428 result from the overlap of the fields of view of the peripheral cameras 210, as described with regards to FIG. 2B. The overlapping regions allow the processing server 140 to seamlessly and accurately construct the frames 402-428 into a 360 degree image for a virtual reality system.

Similarly, the frames 429 and 430 are captured by the plurality of axis cameras, wherein an individual frame is captured by one axis camera. In the embodiment of FIG. 4, frame 429 is captured by the top axis camera 212, and frame 430 is captured by the bottom axis camera 214. Each frame 429 and 430 includes a region where it overlaps with the frames 402-428 captured by the peripheral cameras 210, providing the top and bottom views of the local area. The overlapping regions of the frames 429 and 430 result from the overlap of the fields of view of the axis cameras with the peripheral cameras 210. The overlapping regions allow the processing server 140 to seamlessly and accurately combine the frames 429 and 430 with the frames 402-428 into a 360 degree image for a virtual reality system.

Furthermore, in the embodiment of FIG. 4, each frame 402-430 includes metadata that allows the processing server 140 to create the constructed image 400 from the individual frames 402-430. As described with regards to FIG. 1, metadata may include, e.g., frame rate, exposure settings (e.g., shutter speed, gain, etc.), copyright information, date/time information, camera identifier, names, labeling, some other information associated with the image information, or some combination thereof. For example, in one embodiment, to create the constructed image 400, the processing server 140 may use the date/time information for each frame to verify that the appropriate frames are combined. In another embodiment, the processing server 140 may use the camera identifier information to ensure that the frames are combined in the correct sequence. The metadata included with each frame 402-428 ensures that individual frames are combined correctly to create a 360 degree image for a virtual reality system.

Figure 5:
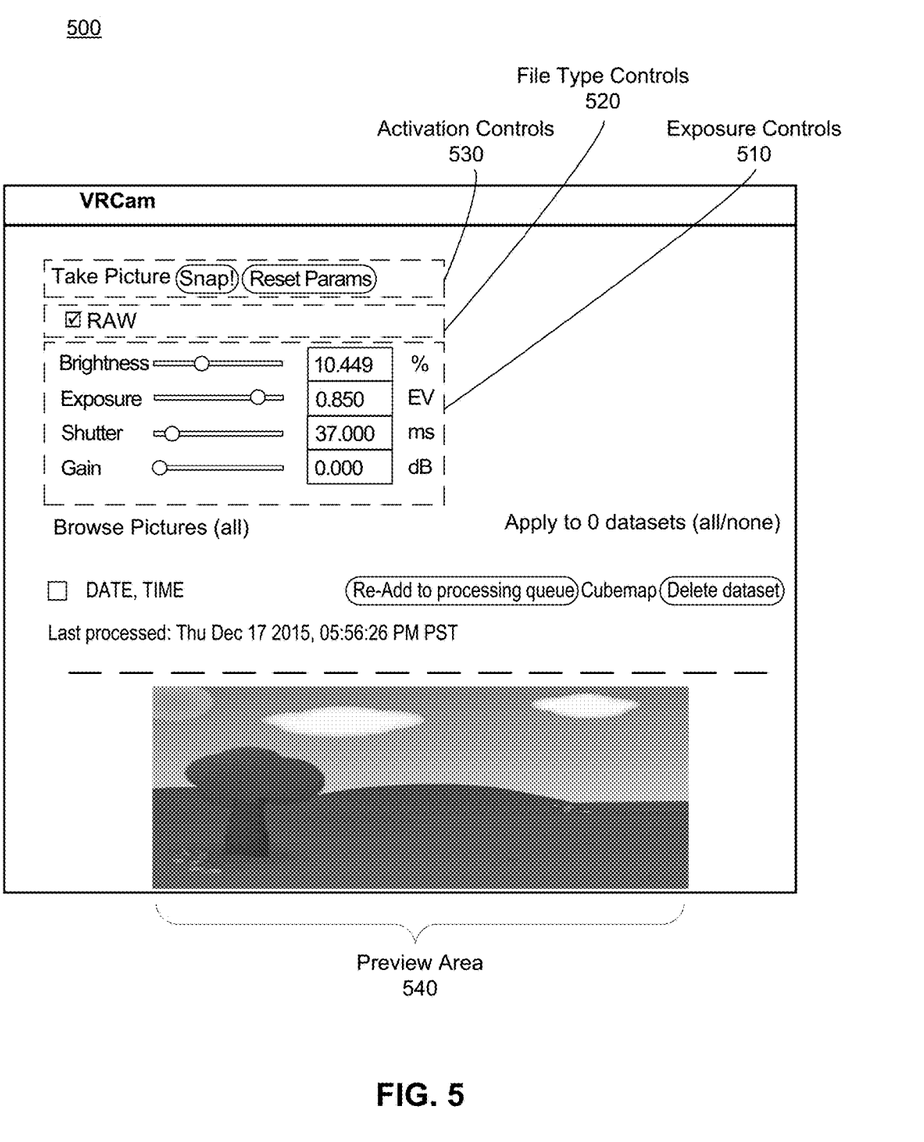
FIG. 5 illustrates a user interface for a camera system, according to one embodiment.

FIG. 5 illustrates a user interface 500 for the camera system 130, according to one embodiment. The user interface 500 may be, e.g., the user interface 340. The user interface 500 allows a user to control the camera system 130. The user interface 500 includes exposure controls 510, file type controls 520, activation controls 530, and a preview area 540.

The exposure controls 510 allow a user to control and adjust the exposure settings of the camera assembly 310. The exposure controls 510 may include brightness, aperture, shutter, and gain settings. In some embodiments, the exposure settings may be determined from a principal camera in the camera assembly 310, or the exposure settings may be determined from all of the cameras in the camera assembly 310. The determined settings may serve as initial settings, from which the user can adjust using the exposure controls 510. Once the exposure controls 510 have been adjusted to the desired settings, the desired settings can be provided to each camera in the camera assembly 310.

The file type controls 520 allow a user to control the format in which image information is captured. The file type controls 520 may include various file types for images (e.g. .jpeg, .tif, .png, etc.), audio (e.g. .aac, .mp3, .wav, etc.), and/or video (e.g. .mpg, .mov, .wmv, etc.). Some embodiments may allow a user to control the file type for each individual type of image information.

The activation controls 530 allow a user to control the operation of the camera assembly 310. The activation controls 530 may include, but are not limited to, options to power the camera assembly 310 on and off, to activate the camera assembly 310 to capture image information, to reset the settings of the camera assembly 310, to activate the processing server 140 to start or stop processing the captured image information, among other functionalities for the camera system 130.

The preview area 540 allows a user to preview an image constructed from the image information captured by the cameras of the camera assembly 310. The preview area 540 assists the user in determining desired exposure settings of the camera assembly 310 and/or desired positioning of the camera assembly 310 within the local area. The preview area 540 ensures that the camera assembly 310 is capturing image information to construct desired 3D-360 degree content for a virtual reality system.

In some embodiments, the user interface 340 also allows a user to control the processing server 140, access the data store 120, and access the data store 320. In the embodiment of FIG. 5, the user interface 340 includes settings (e.g. brightness, exposure, shutter, gain), an image preview, and metadata associated with the image preview. The settings may be modified by the user, and the settings are sent to the camera controller 350, which commands the camera assembly 310 and implements the camera settings globally onto the peripheral cameras 210 and axis cameras. The user interface 340 may be accessed on any device that has a network connection to the network 105.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A camera system comprising:
   a plurality of peripheral cameras, the peripheral cameras arranged in a ring configuration around a center point such that an optical axis of each camera is within a plane and a field of view of each camera faces away from the center point, and that outside of a threshold distance any object in a portion of a local area is within a field of view of at least two peripheral cameras;
   at least one axis camera positioned such that an optical axis of the at least one axis camera is along an alignment axis that runs through the center point;
   a first rigid plate positioned along the alignment axis such that the alignment axis bisects a center of the first plate, the first plate including a first top surface and a first bottom surface, the first top surface coupled to a first mounting surface of the at least one axis camera, wherein the at least one axis camera is vertically offset from the first top surface, the first bottom surface coupled to first mounting surfaces of the plurality of peripheral cameras; and
   a second rigid plate positioned along the alignment axis such that the alignment axis bisects the center of the second plate, the second plate including a second top surface coupled to second mounting surfaces of the plurality of peripheral cameras.

2. The camera system of claim 1, wherein the first plate and the second plate are disk-shaped.

3. The camera system of claim 1, further comprising a bottom axis camera that is positioned such that an optical axis of the bottom axis camera is along the alignment axis that runs through the center point, and the center point is between a top axis camera and the bottom axis camera.

4. The camera system of claim 1, wherein the second plate includes a second bottom surface, and the camera system further comprising:
   a support structure that is coupled to the second bottom surface, the support structure configured to support the camera system.

5. The camera system of claim 1, further comprising:
   a camera controller configured to:
   instruct the camera system to generate image information of the local area,
   provide the image information to a processing server, wherein the processing server generates content using the image information, and the generated content includes a three-dimensional (3D) portion and a plurality of two-dimensional (2D) portions, the 3D portion corresponding to portions of the content generated using image information from the peripheral cameras and the 2D portion corresponding to portions of the content generated using image information from the at least one axis camera.

6. The camera system of claim 1, further comprising a plurality of axis cameras that include a first group of cameras positioned such that their respective optical axes are between the plane and the alignment axis, the first group of cameras having a total field of view that encompasses a second portion of the local area, and that outside of a second threshold distance any object in the second portion of the local area is within a field of view of at least two axis cameras in the first group of cameras.

7. The camera system of claim 1, wherein the at least one axis camera has a field of view that is larger than a field of view of each of the peripheral cameras.

8. A camera system comprising:
   a plurality of peripheral cameras, the peripheral cameras arranged around a center point such that an optical axis of each camera is within a plane and a field of view of each camera faces away from the center point, and that outside of a threshold distance any object in a portion of a local area is within a field of view of at least two peripheral cameras;
   at least one axis camera that is positioned such that an optical axis of the at least one axis camera is along an alignment axis that runs through the center point; and
   a first rigid plate positioned along the alignment axis such that the alignment axis bisects a center of the first plate, the first plate including a first top surface and a first bottom surface, the first top surface coupled to a first mounting surface of the at least one axis camera, wherein the at least one axis camera is vertically offset from the first top surface, the first bottom surface coupled to first mounting surfaces of the plurality of peripheral cameras.

9. The camera system of claim 8, further comprising:
   a second rigid plate positioned along the alignment axis such that the alignment axis bisects the center of the second plate, the second plate including a second top surface coupled to second mounting surfaces of the plurality of peripheral cameras.

10. The camera system of claim 9, wherein the first plate and the second plate are disk-shaped.

11. The camera system of claim 9, wherein the second rigid plate includes a second bottom surface, and the camera system further comprising:
    a support structure that is coupled to the second bottom surface, the support structure configured to support the camera system.

12. The camera system of claim 9, further comprising a bottom axis camera coupled to the second bottom surface of the second rigid plate, and the bottom axis camera is positioned such that an optical axis of the bottom axis camera is along the alignment axis that runs through the center point, and the center point is between a top axis camera and the bottom axis camera.

13. The camera system of claim 8, further comprising:
    a camera controller configured to:
    instruct the camera system to generate image information of the local area, and
    provide the image information to a processing server, wherein the processing server generates content using the image information, and the generated content includes a three-dimensional (3D) portion and a plurality of two-dimensional (2D) portions, the 3D portion corresponding to portions of the content generated using image information from the peripheral cameras and the 2D portion corresponding to portions of the content generated using image information from the at least one axis camera.

14. The camera system of claim 8, further comprising a plurality of axis cameras that include a first group of cameras positioned such that their respective optical axes are between the plane and the alignment axis, the first group of cameras having a total field of view that encompasses a second portion of the local area, and that outside of a second threshold distance any object in the second portion of the local area is within a field of view of at least two axis cameras in the first group of cameras.

15. The camera system of claim 8, wherein the at least one axis camera has a field of view that is larger than a field of view of each of the peripheral cameras.

16. A camera system comprising:
a plurality of peripheral cameras, the peripheral cameras arranged around a center point such that an optical axis of each camera is within a plane and a field of view of each camera faces away from the center point, and that outside of a threshold distance any object in a portion of a local area is within a field of view of at least two peripheral cameras;
a plurality of axis cameras including a top axis camera and a bottom axis camera, the top axis camera is positioned such that an optical axis of the top axis camera is along an alignment axis that runs through the center point, and the bottom axis camera is positioned such that an optical axis of the bottom axis camera is along the alignment axis that runs through the center point, and the center point is between the top axis camera and the bottom axis camera;
a first rigid plate positioned along the alignment axis such that the alignment axis bisects a center of the first plate, the first plate including a first top surface and a first bottom surface, the first top surface coupled to a first mounting surface of the top axis camera, wherein the top axis camera is vertically offset from the first top surface, the first bottom surface coupled to first mounting surfaces of the plurality of peripheral cameras; and
a second rigid plate positioned along the alignment axis such that the alignment axis bisects the center of the second plate, the second plate including a second top surface coupled to second mounting surfaces of the plurality of peripheral cameras.

17. The camera system of claim 16, wherein the second plate includes a second bottom surface, and the camera system further comprising:
a support structure that is coupled to the second bottom surface, the support structure configured to support the camera system.

18. The camera system of claim 17, further comprising a second bottom axis camera that is coupled to the second bottom surface of the second rigid plate, and the second bottom axis camera is positioned such that a second optical axis of the second bottom axis camera is parallel to the alignment axis that runs through the center point, and that the support structure is parallel to and in between the second optical axis and the alignment axis.

19. The camera system of claim 16, further comprising:
a camera controller configured to:
instruct the camera system to generate image information of the local area, and
provide the image information to a processing server, wherein the processing server generates content using the image information, and the generated content includes a three-dimensional (3D) portion and a plurality of two-dimensional (2D) portions, the 3D portion corresponding to portions of the content generated using image information from the peripheral cameras and the 2D portion corresponding to portions of the content generated using image information from the axis cameras.

20. The camera system of claim 16, wherein the plurality of axis cameras includes a first group of cameras positioned such that their respective optical axes are between the plane and the alignment axis, the first group of cameras having a total field of view that encompasses a second portion of the local area, and that outside of a second threshold distance any object in the second portion of the local area is within a field of view of at least two axis cameras in the first group of cameras.

* * * * *